(12) United States Patent
Sienel

(10) Patent No.: US 12,546,538 B2
(45) Date of Patent: Feb. 10, 2026

(54) MICROCHANNEL HEAT EXCHANGER TUBE SUPPORTED BRACKET

(71) Applicant: Carrier Corporation, Palm Beach Gardens, FL (US)

(72) Inventor: Tobias H. Sienel, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/631,224

(22) Filed: Apr. 10, 2024

(65) Prior Publication Data

US 2024/0255227 A1 Aug. 1, 2024

Related U.S. Application Data

(62) Division of application No. 17/058,819, filed on Nov. 25, 2020, now Pat. No. 11,982,491.

(51) Int. Cl.
*F28D 1/047* (2006.01)
*B23K 1/00* (2006.01)
(Continued)

(52) U.S. Cl.
CPC .......... *F28D 1/0476* (2013.01); *B23K 1/0012* (2013.01); *B23P 15/26* (2013.01); *F28F 9/001* (2013.01); *F28F 9/0131* (2013.01)

(58) Field of Classification Search
CPC ......... Y10T 29/49377; Y10T 29/49389; Y10T 29/49393; Y10T 29/49364; B23K 1/0012; B23P 15/26
See application file for complete search history.

(56) References Cited

U.S. PATENT DOCUMENTS 1,987,422 A * 1/1935 Steenstrup ............ F25D 23/061
29/890.038
2,289,685 A * 7/1942 Schoen .................. B21D 7/022
29/445
(Continued)

FOREIGN PATENT DOCUMENTS

CN 101865625 B 9/2012
CN 202582334 U 12/2012
(Continued)

OTHER PUBLICATIONS

Chinese Office Action for Chinese Application No. 201980042490. 2; Issued Oct. 27, 2022, 32 pages.
(Continued)

*Primary Examiner* — Jason L Vaughan
(74) *Attorney, Agent, or Firm* — CANTOR COLBURN LLP

(57) ABSTRACT

A heat exchanger includes a plurality of heat exchange tube segments defining a plurality of fluid pathways therein and a plurality of fins disposed between adjacent heat exchange tube segments of the plurality of heat exchange tube segments. A bend is formed in the plurality of heat exchange tube segments defining a first portion of the heat exchanger located at a first side of the bend, and a second portion of the heat exchanger located at a second side of the bend opposite the first side. A support is positioned at or near the bend, the support including and includes a support base and at least one support finger extending from the support base and into a gap between adjacent heat exchange tube segments of the plurality of heat exchange tube segments.

6 Claims, 9 Drawing Sheets

(51) Int. Cl.
  *B23P 15/26* (2006.01)
  *F28F 9/00* (2006.01)
  *F28F 9/013* (2006.01)

(56) References Cited

U.S. PATENT DOCUMENTS

| | | | | |
|---|---|---|---|---|
| 3,711,681 | A | * | 1/1973 | Leuschner ............... H05B 3/50 392/467 |
| 3,742,567 | A | * | 7/1973 | Kaelin .................. F28F 9/0131 165/162 |
| 4,054,980 | A | * | 10/1977 | Roma .................... F28F 21/062 165/172 |
| 4,616,390 | A | * | 10/1986 | MacCracken ......... F28F 9/0132 165/172 |
| 4,625,378 | A | * | 12/1986 | Tanno ....................... F28F 1/32 29/727 |
| 4,671,347 | A | * | 6/1987 | MacCracken ......... F28D 20/021 165/172 |
| 5,097,897 | A | * | 3/1992 | Watanabe ................. F28D 7/08 165/170 |
| 5,411,079 | A | * | 5/1995 | Sasaki ................... F28D 1/0246 165/171 |
| 5,531,268 | A | * | 7/1996 | Hoshino ................. F28F 1/025 165/149 |
| 5,954,125 | A | * | 9/1999 | Mantegazza ......... B21D 53/085 29/890.047 |
| 6,263,954 | B1 | | 7/2001 | Nakayama |
| 6,513,579 | B1 | | 2/2003 | Kent et al. |
| 6,705,387 | B2 | | 3/2004 | Kokubunji et al. |
| 7,007,504 | B2 | * | 3/2006 | Kang ...................... F24S 70/60 29/890.038 |
| 7,640,970 | B2 | | 1/2010 | Kim et al. |
| 7,921,904 | B2 | * | 4/2011 | Matter .................... F28F 9/262 165/150 |
| 8,464,782 | B2 | | 6/2013 | Samuelson et al. |
| 9,528,770 | B2 | | 12/2016 | Jiang et al. |
| D787,033 | S | | 5/2017 | Huan et al. |
| 9,851,160 | B2 | | 12/2017 | Peppard et al. |
| 2006/0130517 | A1 | | 6/2006 | Merkys et al. |
| 2007/0051506 | A1 | * | 3/2007 | Lee ........................... F28F 1/36 165/184 |
| 2008/0173434 | A1 | | 7/2008 | Matter et al. |
| 2013/0255913 | A1 | | 10/2013 | Zwiefel |
| 2017/0343288 | A1 | | 11/2017 | Joardar |
| 2018/0003448 | A1 | | 1/2018 | Wu et al. |
| 2021/0231375 | A1 | | 7/2021 | Sienel |
| 2021/0270473 | A1 | | 9/2021 | Nakano et al. |

FOREIGN PATENT DOCUMENTS

| | | |
|---|---|---|
| CN | 104110977 A | 10/2014 |
| CN | 104344745 A | 2/2015 |
| CN | 104713387 A | 6/2015 |
| CN | 104807360 A | 7/2015 |
| CN | 104061720 B | 12/2015 |
| CN | 204923948 U | 12/2015 |
| CN | 103196259 B | 4/2016 |
| CN | 105518405 A | 4/2016 |
| EP | 0654645 A2 | 5/1995 |
| EP | 1601915 B1 | 2/2007 |
| EP | 2513583 B1 | 4/2014 |
| EP | 2513742 B1 | 4/2014 |
| EP | 2884209 B1 | 10/2017 |
| EP | 2993427 B1 | 3/2018 |
| JP | H08145580 A | 6/1996 |
| JP | 2006242458 A | 9/2006 |
| JP | 2015055410 A | 3/2015 |
| JP | 2017133790 A | 8/2017 |
| WO | 2017030922 A1 | 2/2017 |
| WO | 2018070375 A1 | 4/2018 |

OTHER PUBLICATIONS

International Search Report for International Application No. PCT/US2019/055866, International Filing Date: Oct. 11, 2019, Date of Mailing: Mar. 5, 2020, 5 pages.

Japanese Office Action for Japanese Application No. JP2020570578; date of mailing Oct. 31, 2023; 6 pages.

Written Opinion for International Application No. PCT/US2019/055866, International Filing Date: Oct. 11, 2019, Date of Mailing: Mar. 5, 2020, 7 pages.

* cited by examiner

MICROCHANNEL HEAT EXCHANGER TUBE SUPPORTED BRACKET

CROSS REFERENCE TO RELATED APPLICATIONS

This application is a division of U.S. application Ser. No. 17/058,819 filed Nov. 25, 2020, which is a National Stage application of PCT/US2019/055866, filed Oct. 11, 2019, which claims the benefit of U.S. Provisional Application No. 62/747,271 filed Oct. 18, 2018, the disclosures of which are incorporated herein by reference in their entirety.

BACKGROUND

Exemplary embodiments pertain to the art of heat exchangers. More particularly, the present disclosure relates to the support of folded or ribbon bent microchannel heat exchangers.

Microchannel heat exchangers are normally supported by refrigerant containing manifolds connected to the refrigerant channels of the heat exchanger. Another support system for supporting microchannel heat exchangers is a frame that surrounds the heat exchanger. Recently, interest in folded or ribbon bent heat exchangers has increased. In such heat exchangers, manifolds are disposed at only a first end of the heat exchanger, such that a second end of the heat exchanger does not have a manifold that may be used for support of the heat exchanger. Currently, frames are utilized in such cases to encapsulate the heat exchanger and provide the necessary support. Frames are often not cost effective or feasible for all heat exchangers.

BRIEF DESCRIPTION

In one embodiment, a heat exchanger includes a plurality of heat exchange tube segments defining a plurality of fluid pathways therein and a plurality of fins disposed between adjacent heat exchange tube segments of the plurality of heat exchange tube segments. A bend is formed in the plurality of heat exchange tube segments defining a first portion of the heat exchanger located at a first side of the bend, and a second portion of the heat exchanger located at a second side of the bend opposite the first side. A support is positioned at or near the bend, the support including and includes a support base and at least one support finger extending from the support base and into a gap between adjacent heat exchange tube segments of the plurality of heat exchange tube segments.

Additionally or alternatively, in this or other embodiments the bend is a ribbon bend.

Additionally or alternatively, in this or other embodiments the support is secured to at least one heat exchange tube segment of the plurality of heat exchange tube segments.

Additionally or alternatively, in this or other embodiments the at least one support finger extends orthogonally from the support base.

Additionally or alternatively, in this or other embodiments the at least one support finger extends from the support base at a finger angle equal to a ribbon angle of the heat exchange tube segments at the bend.

Additionally or alternatively, in this or other embodiments the bend is one of an acute angle or an obtuse angle.

Additionally or alternatively, in this or other embodiments the bend is at a bend angle of 180 degrees.

Additionally or alternatively, in this or other embodiments a first header is fluidly coupled to the plurality of heat exchange tube segments at a first end of the plurality of heat exchange tube segments, and a second header is fluidly coupled to the plurality of heat exchange tube segments as a second end of the plurality of heat exchange tube segments opposite the first end.

Additionally or alternatively, in this or other embodiments the bend is located substantially at a midpoint of the plurality of heat exchange tube segments between the first end and the second end.

Additionally or alternatively, in this or other embodiments the first portion of the heat exchanger is substantially parallel to the second portion of the heat exchanger.

Additionally or alternatively, in this or other embodiments the plurality of fins are absent from the bend.

Additionally or alternatively, in this or other embodiments the heat exchanger is substantially C-shaped.

Additionally or alternatively, in this or other embodiments the heat exchanger is configured as one of a condenser or an evaporator of a vapor compression cycle.

In another embodiment, a method of forming a heat exchanger includes arranging a plurality of heat exchange tube segments to defining at least one gap between adjacent heat exchange tube segments of the plurality of heat exchange tube segments, and securing a support to the plurality of heat exchange tube segments, the support including a support base and at least one support finger extending from the support base into the at least one gap. At least one bend is formed in the plurality of heat exchange tube segments. The support is located at the at least one bend.

Additionally or alternatively, in this or other embodiments the securing the support to the plurality of heat exchange tube segments comprises brazing the support to at least one heat exchange tube segment of the plurality of heat exchange tube segments.

Additionally or alternatively, in this or other embodiments the support is secured to the plurality of heat exchange tube segments prior to forming the at least one bend.

Additionally or alternatively, in this or other embodiments a plurality of fins are arranged between adjacent heat exchange tube segments of the plurality of heat exchange tube segments.

Additionally or alternatively, in this or other embodiments the plurality of fins are absent from the at least one bend.

Additionally or alternatively, in this or other embodiments a first header is secured at a first end of the plurality of heat exchange tube segments, and a second header is secured at a second end of the plurality of heat exchange tube segments, opposite the first end.

Additionally or alternatively, in this or other embodiments the support is installed to and secured to the plurality of heat exchange tube segments after forming the at least one bend.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
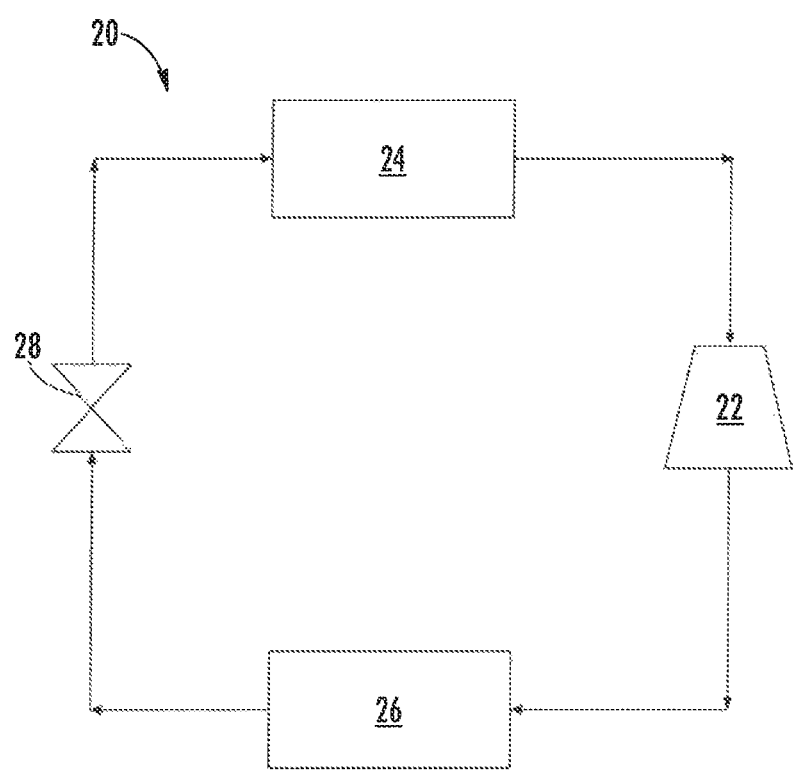
FIG. 1 is a schematic view of an embodiment of a vapor compression cycle.

Referring now to FIG. 1, a vapor compression refrigerant cycle 20 of a heating, ventilation, air conditioning, and refrigeration (HVAC&R) system is schematically illustrated. Exemplary HVAC&R systems include, but are not limited to, split, packaged, chiller, rooftop, supermarket, and transport HVAC&R systems, for example. A refrigerant R is configured to circulate through the vapor compression cycle 20 such that the refrigerant R absorbs heat when evaporated at a low temperature and pressure and releases heat when condensed at a higher temperature and pressure.

Within this vapor compression refrigerant cycle 20, the refrigerant flows in a counterclockwise direction as indicated by the arrow. The compressor 22 receives refrigerant vapor from the evaporator 24 and compresses it to a higher temperature and pressure, with the relatively hot vapor then passing to the condenser 26 where it is cooled and condensed to a liquid state by a heat exchange relationship with a cooling medium (not shown) such as air. The liquid refrigerant R then passes from the condenser 26 to an expansion device 28, wherein the refrigerant R is expanded to a low temperature two-phase liquid/vapor state as it passes to the evaporator 24. The low pressure vapor then returns to the compressor 22 where the cycle is repeated.

Figure 2:
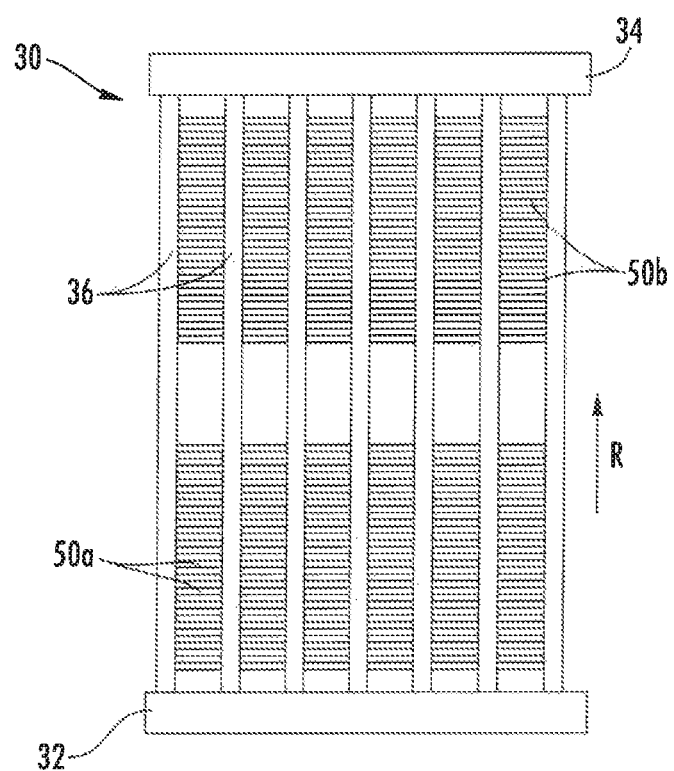
FIG. 2 is a plan view of an embodiment of a heat exchanger prior to a bend operation.

Referring now to FIG. 2, an example of a heat exchanger 30 configured for use in the vapor compression cycle 20 is illustrated in more detail. The heat exchanger 30 may be used as either the condenser 26 or the evaporator 24 in the vapor compression cycle 20. The heat exchanger 30 includes at least a first manifold or header 32, a second manifold or header 34 spaced apart from the first manifold 32, and a plurality of heat exchange tube segments 36 extending in a spaced, parallel relationship between and connecting the first manifold 32 and the second manifold 34. In the illustrated, non-limiting embodiments, the first header 32 and the second header 34 are oriented generally horizontally and the heat exchange tube segments 36 extend generally vertically between the two headers 32, 34. However, in other configurations, the first header 32 and the second header 34 are arranged substantially vertically and the heat exchange tube segments 36 extend horizontally between the first header 32 and the second header 34.

Figure 3:
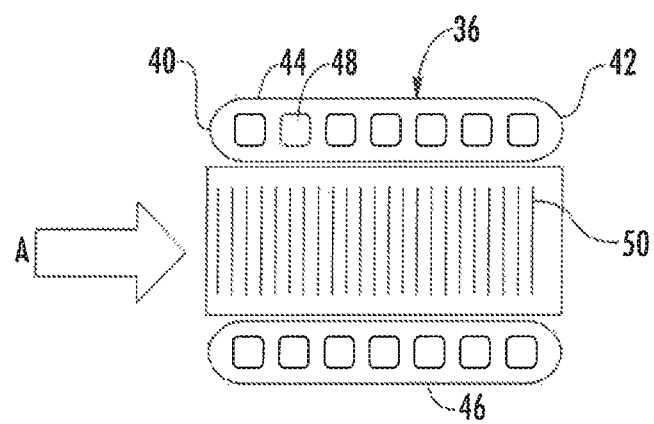
FIG. 3 is a partial cross-sectional view of an embodiment of a heat exchanger.

Referring now to FIG. 3, a cross-sectional view of an embodiment of a heat exchange tube segment 36 is illustrated. The heat exchange tube segment 36 includes a flattened microchannel heat exchange tube having a leading edge 40, a trailing edge 42, a first surface 44 and a second surface 46. The leading edge 40 of the heat exchange tube segment 36 is upstream of its respective trailing edge 42 with respect to airflow A passing through the heat exchanger 30 and flowing across the heat exchange tube segment 36. An interior flow passage of the heat exchange tube segment 36 may be divided by interior walls into a plurality of discrete flow channels 48 that extend over a length of the heat exchange tube segment 36 from an inlet end to an outlet end and establish fluid communication between the first and second manifolds 32, 34. The flow channels 48 may have a circular cross-section or, for example, a rectangular cross-section, a trapezoidal cross-section, a triangular cross-section or another non-circular cross-section. The heat exchange tube segment 36 including discrete flow channels 48 may be formed using known techniques and materials, including but not limited to, extruding or folding.

The heat exchange tube segments 36 disclosed herein include a plurality of fins 50. In some embodiments, the fins 50 are formed from a continuous strip of fin material folded in a ribbon-like serpentine fashion thereby providing a plurality of closely spaced fins 50 that extend generally orthogonally to the heat exchange tube segments 36. Thermal energy exchange between one or more fluids within the heat exchange tube segments 36 and an air flow A occurs through the outside surfaces 44, 46 of the heat exchange tube segments 36 collectively forming a primary heat exchange surface, and also through thermal energy exchange with the fins 50, which defines a secondary heat exchange surface.

Figure 4:
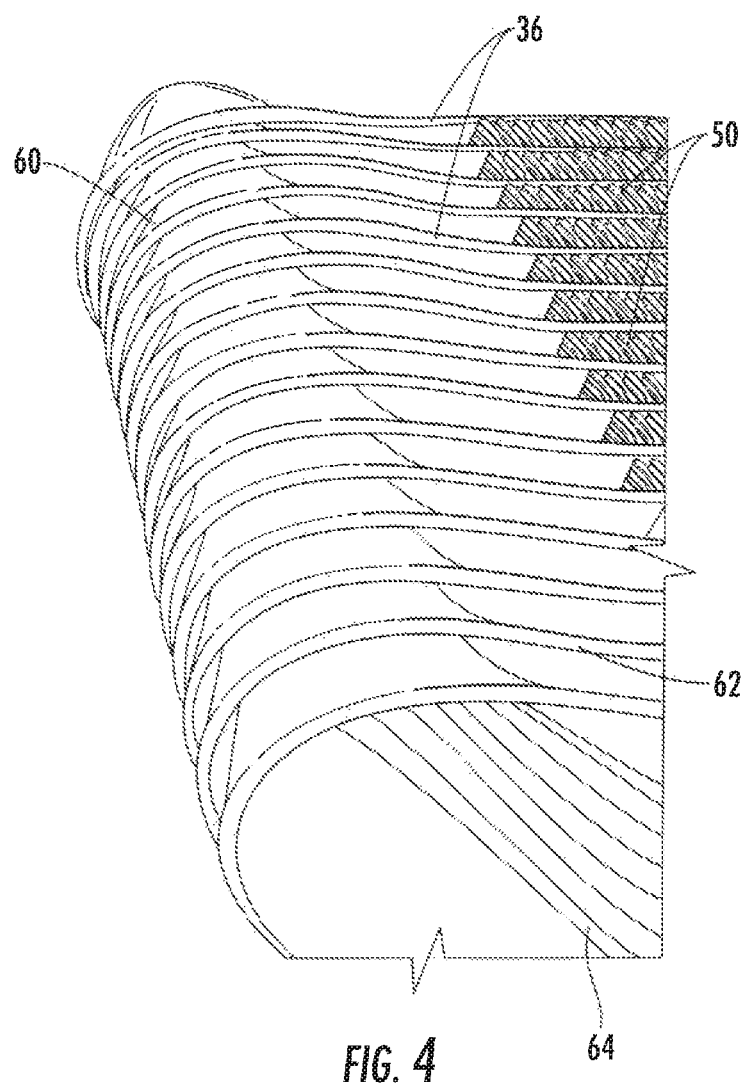
FIG. 4 is a schematic illustration of a bend formed in a heat exchanger.
Figure 5:
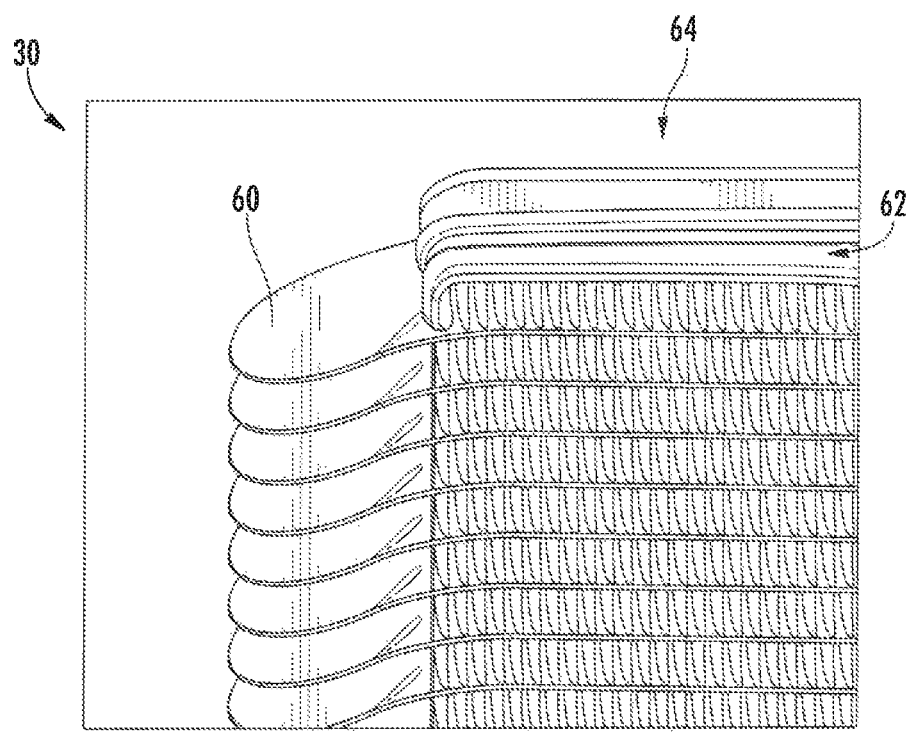
FIG. 5 is a partial perspective view of an embodiment of a bend of a heat exchanger.

As illustrated in FIGS. 4 and 5, a bend 60 is formed in each heat exchange tube segment 36 of the heat exchanger 30. The bend 60 is formed about a bend axis 52 extending substantially perpendicular to the longitudinal axis 54 of the heat exchange tube segments 36. In the illustrated embodiment, and best shown in FIG. 5, the bend 60 is a ribbon bend formed by bending and twisting the heat exchange tube segments 36. In some embodiments, the ribbon bend 60 is formed about a mandrel (not shown). One skilled in the art will appreciate that other means or tools may be utilized in formation of the ribbon bend 60. In a ribbon bend 60, the heat exchange tube segments 36 are at a first orientation, for example horizontal, at each end of the bend 60. Along the bend 60, the heat exchange tube segments 36 are twisted such that at a midpoint of the bend 60, the heat exchange tube segments 36 are at a second orientation, for example vertical or nearly vertical. Other types of bends, however, are contemplated within the scope of the present disclosure. In some embodiments, the ribbon bend 60 is utilized to form a multi-pass heat exchanger 30 configuration relative to air flow A. One skilled in the art will readily appreciate, however, that the ribbon bend 60 may be utilized in formation of other heat exchanger shapes, such as, for example, a V-shaped heat exchanger 30.

The bend 60 defines a first section 62 and a second section 64 of the heat exchange tube segment 36, with the first section 62 and the second section 64 disposed at opposing sides of the bend 60. In the bent configuration, the first section 62 defines a first pass or first slab of the heat exchanger 30, and the second section 64 defines a second pass or the second slab of the heat exchanger 30, thereby defining the multi-pass heat exchanger 30 configuration. In the illustrated embodiment, the bend 60 is formed at an approximate midpoint of the heat exchange tube segments 36 between the first manifold 32 and the second manifold 34, such that the first section 62 and the second section 64 have approximately equal lengths. In other embodiments, other configurations may be utilized where lengths of the first section 62 and the second section 64 may be unequal.

Figure 6:
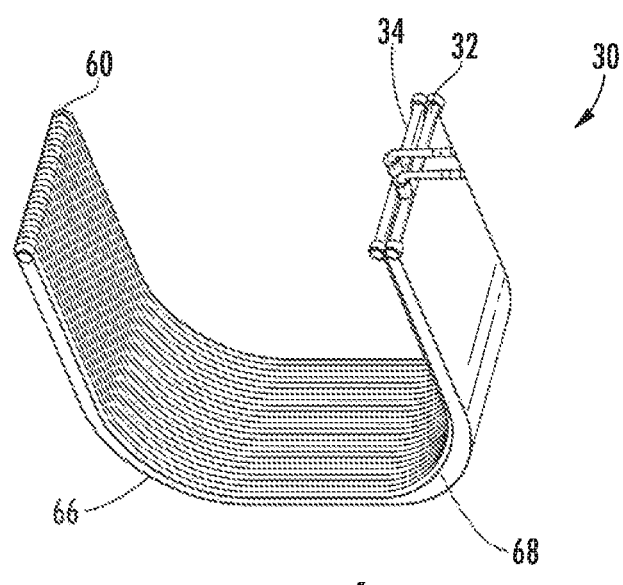
FIG. 6 is a perspective view of another embodiment of a heat exchanger.

As shown in the FIGs., the heat exchanger 30 may be formed such that the first section 62 and the second section 64 are arranged at one of an obtuse angle or an acute angle relative to each other. Further, as shown in FIG. 5, the bend 60 may be configured such that the first section 62 and the second section 64 are substantially parallel. As a result of the bend 60, the heat exchanger 30 may be configured as a flat, planar heat exchanger 30 as shown in FIG. 5, or as an A-coil or V-coil heat exchanger 30. Further, referring now to FIG. 6, the heat exchanger 30 configuration may take other shapes, such as a C-shaped heat exchanger 30 in which the bend 60 is a 180 degree bend, and the heat exchanger 30 includes additional bends 66, 68 between the bend 60 and the manifolds 32, 34. The additional bends 66, 68 are less than 180 degrees, resulting in the C-shaped heat exchanger 30 shown in FIG. 6. In some embodiments, the bends 66, 68 are ribbon bends, while in other embodiments other types of bends may be utilized.

Referring again to FIG. 2, a plurality of first fins 50a are arranged at the first section 62, and a plurality of second fins 50b are arranged at the second section 64, while the bend 60 portion of each heat exchange tube segment 36 is absent any fins 50. The first fins 50a and the second fins 50b may be substantially identical, or alternatively may vary in one or more of size, shape, density or material.

Figure 7:
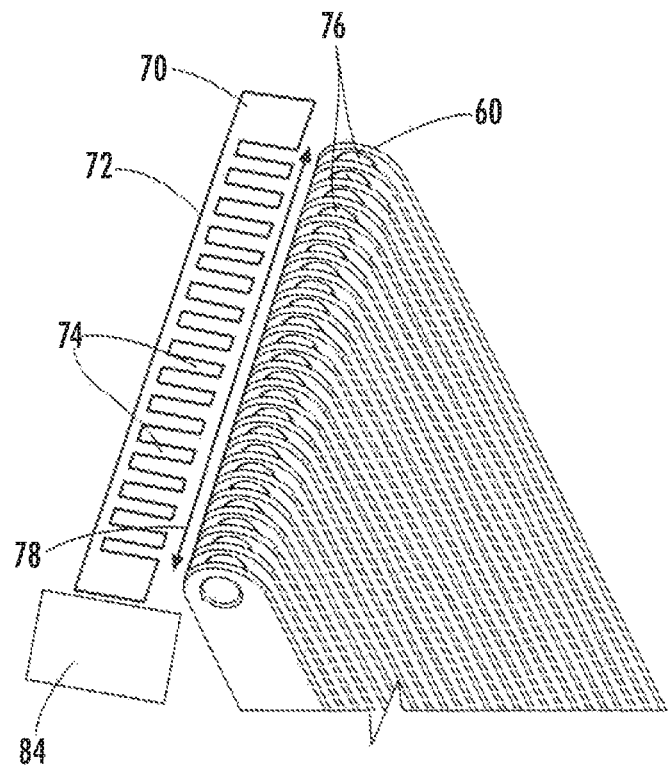
FIG. 7 is a partial perspective view of an embodiment of a heat exchanger including a support.
Figure 8:
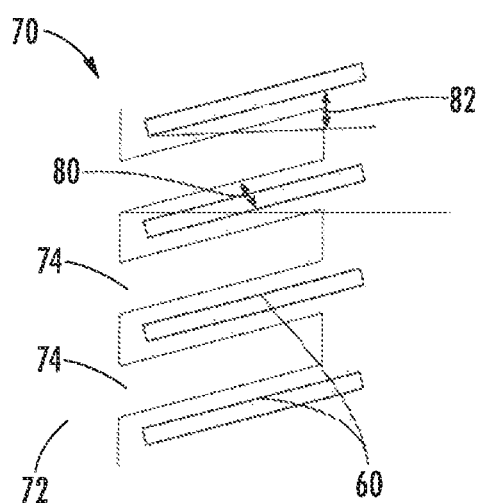
FIG. 8 is a partial sectional view of another embodiment of a heat exchanger including a support.

Referring now to FIG. 7, the heat exchanger 30 includes a support 70 located at the bend 60. The support 70 is a comb-shaped structure secured to the heat exchange tube segments 36 at the bend 60, where no fins 50 are present. The support 70 includes a base portion 72 and a plurality of fingers 74 extending from the base portion 72. The fingers 74 are configured to each be inserted into ribbon gaps 76 between adjacent heat exchange tube segments 36 at the bend 60. In some embodiments, the support 70 spans an entire heat exchanger width 78, such as shown in FIG. 8, while in other embodiments the support 70 spans only a portion of the heat exchanger width 78, or multiple supports 70 are utilized at the bend 60, each extending partially along the heat exchanger width 78. The support 70 is secured to the heat exchange tube segment 36 by, for example, brazing. Further, in some embodiments, the support 70 is formed from the same material as the heat exchange tube segment 36, while in other embodiments the support material 70 may differ from the heat exchange tube segment 36 material, as long as the support 70 may be secured to the heat exchange tube segment 36 at the bend 60 to provide support for the heat exchanger 30 at the bend 60. The support 70 is utilized to secure the heat exchanger 30 to one or more brackets 84 or other mounting structure to position the heat exchanger 30 in the HVAC&R system.

In other embodiments, fingers 74 are inserted into each ribbon gap 76, while in other embodiments, fingers 74 may be omitted from at least some of the ribbon gaps 76, and the support 70 still may provide sufficient support for the heat exchanger 30 at the bend 60. In the embodiment of FIG. 7, the plurality of fingers 74 extend orthogonally from the base portion 72. In another embodiment, illustrated in the embodiment of FIG. 8, the plurality of fingers 74 extend non-orthogonally from the base portion 72, at a finger angle 80 complimentary to, and in some embodiments substantially equal to, a ribbon angle 82 of the bend 60, representing a degree of twist of the heat exchange tube segment 36 due to the bend process. In the embodiment of FIG. 8, the support 70 is secured to the heat exchange tube segment 36 by, for example, a glue or other adhesive.

Figure 9:
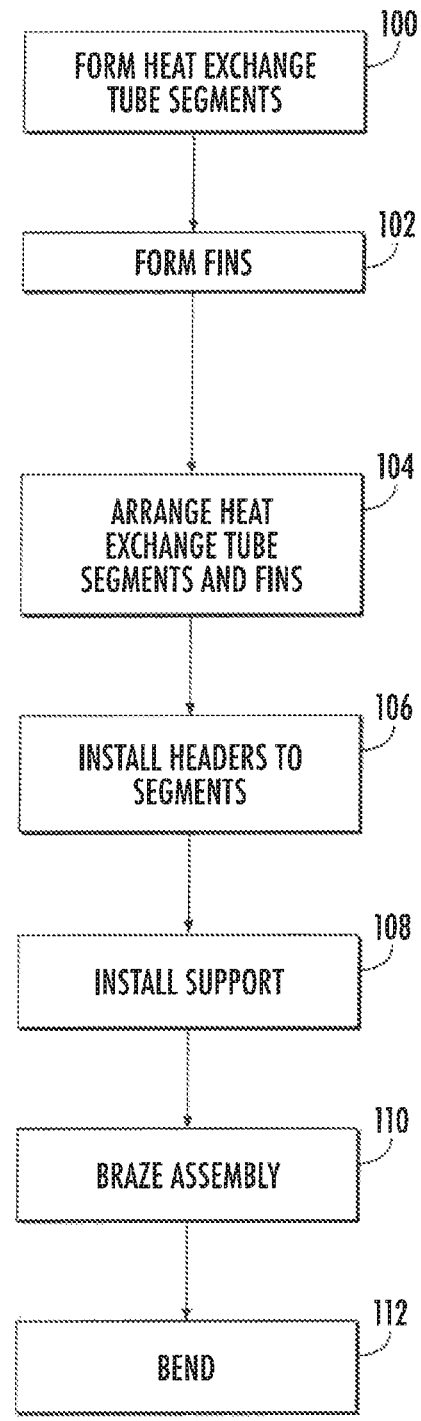
FIG. 9 is a schematic illustration of a method of forming a heat exchanger.

Referring to FIG. 9, illustrated is a schematic view of a method of forming the heat exchanger 30. First, a core of the heat exchanger 30 is assembled. In the embodiment of FIG. 9, in step 100, the heat exchange tube segments 36 are formed, and the fins 50 are formed at step 102. The heat exchange tube segment s 36 and fins are stacked in alternatingly layers in step 104. At step 106, the first header 32 and the second header 34 are installed to the heat exchange tube segments 36. Alternatively, in another embodiment, the first header 32 and the second header 34 are installed to the heat exchange tube segments 36, after which the fins 50 are inserted between heat exchange tube segments 36. In block 108, the support 70 or supports are inserted into the heat exchanger 30, forming a core assembly. At block 110, the core assembly is brazed together, securing the heat exchange tube segments 36, fins 50, headers 32, 34 and support 70 in place. After brazing of the assembly, at block 110, the bend 60 or bends are formed in the heat exchanger 30. One skilled in the art will appreciate that while in the embodiment illustrated in FIG. 9 the support 70 is installed after installation of the first header 32 and the second header 34, in other embodiments the support 70 is installed at any point prior to brazing of the of the assembly.

Figure 10:
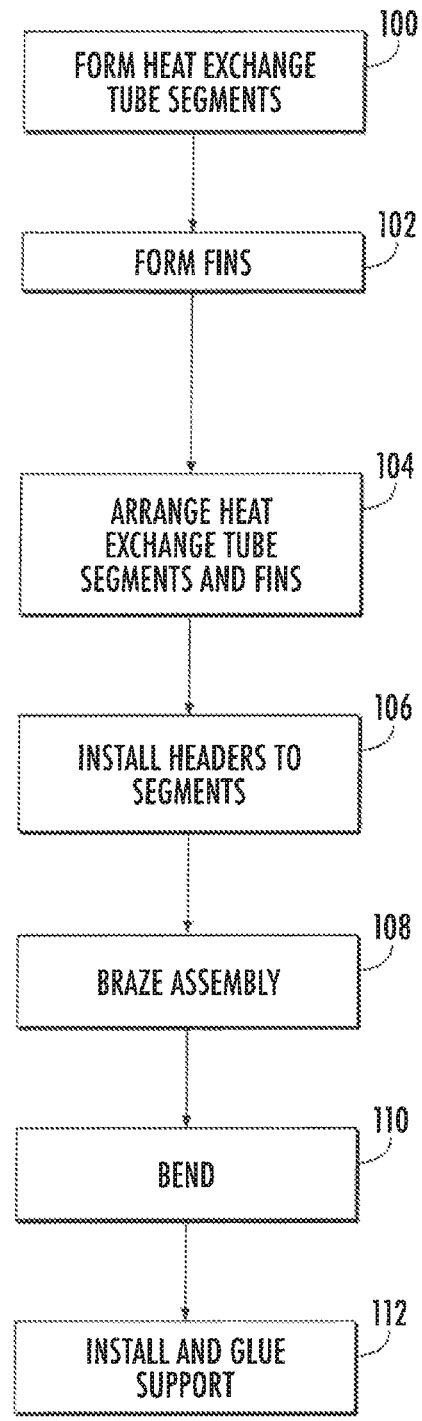
FIG. 10 is a schematic illustration of another method of forming a heat exchanger.

While in the exemplary method of FIG. 9, the bend 60 or bends are formed after brazing the support 70 in the heat exchanger, it is to be appreciated that in other embodiments the support 70 may be installed by, for example, gluing the support 70 in place after forming of the bend 60 or bends, as shown in the flowchart of FIG. 10.

Utilizing the support 70 of the present disclosure allows the heat exchanger 30 to be supported from a variety of locations along the heat exchange tube segments 36, as opposed to current heat exchangers, which need to be supported from the manifolds 32, 34 or via a frame surrounding the heat exchanger 30. Further, the support 70 provides a more cost-effective solution than the previous frame. Providing the support 70 at or near the bend 60 or bends of the heat exchanger 30 has the additional benefit of preventing relative movement of the heat exchange tube segments 36 normally occurring during the bend process, which improves system robustness.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of forming a heat exchanger, comprising:
arranging a plurality of heat exchange tube segments to define at least one gap between adjacent heat exchange tube segments of the plurality of heat exchange tube segments;
securing a support to the plurality of heat exchange tube segments, the support including:
a support base:
at least one support finger extending from the support base into the at least one gap; and
forming at least one bend in the plurality of heat exchange tube segments, the support disposed at the at least one bend;
securing a first header at a first end of the plurality of heat exchange tube segments; and
securing a second header at a second end of the plurality of heat exchange tube segments, opposite the first end.

2. The method of claim 1, wherein the securing the support to the plurality of heat exchange tube segments comprises brazing the support to at least one heat exchange tube segment of the plurality of heat exchange tube segments.

3. The method of claim 1, wherein the support is secured to the plurality of heat exchange tube segments prior to forming the at least one bend.

4. The method of claim 1, further comprising arranging a plurality of fins between adjacent heat exchange tube segments of the plurality of heat exchange tube segments.

5. The method of claim 1, wherein the plurality of fins are absent from the at least one bend.

6. The method of claim 1, wherein the support is installed to and secured to the plurality of heat exchange tube segments after forming the at least one bend.

* * * * *